(12) United States Patent
Hamby et al.

(10) Patent No.: US 10,809,985 B2
(45) Date of Patent: Oct. 20, 2020

(54) INSTRUMENTING PROGRAM CODE

(71) Applicant: MICROSOFT TECHNOLOGY LICENSING, LLC, Redmond, WA (US)

(72) Inventors: John Lawrence Hamby, Port Townsend, WA (US); Manish Kumar Jayaswal, Redmond, WA (US); Andrew Michael Casey, Redmond, WA (US); Aleksey Tsingauz, Renton, WA (US); Tomas Matousek, Redmond, WA (US); Gen Lu, Redmond, WA (US); Tanner Evan Gooding, Redmond, WA (US); Ghanashyam Chandrasekhar Namboodiripad, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/454,990

(22) Filed: Mar. 9, 2017

(65) Prior Publication Data
US 2018/0260198 A1    Sep. 13, 2018

(51) Int. Cl.
    *G06F 8/41*    (2018.01)
(52) U.S. Cl.
    CPC .............. *G06F 8/443* (2013.01); *G06F 8/447* (2013.01)
(58) Field of Classification Search
    CPC .................................. G06F 8/443; G06F 8/447
    See application file for complete search history.

(56) References Cited

U.S. PATENT DOCUMENTS

| | | | | |
|---|---|---|---|---|
| 5,581,696 A | * | 12/1996 | Kolawa | G06F 11/3624 714/38.1 |
| 5,790,858 A | * | 8/1998 | Vogel | G06F 11/3612 714/35 |
| 5,987,249 A | * | 11/1999 | Grossman | G06F 11/3644 714/35 |
| 6,085,029 A | | 7/2000 | Kolawa et al. | |

(Continued)

OTHER PUBLICATIONS

U.S. Appl. No. 15/454,949, Tsingauz, et al., "Extensible Instrumentation", filed Mar. 9, 2017.

(Continued)

*Primary Examiner* — Viva Miller
(74) *Attorney, Agent, or Firm* — Rainier Patents, P.S.

(57) ABSTRACT

A compiler can instrument a program during the front end of compilation to collect data about runtime behavior when the program is executed. Instrumentation can occur during source language processing rather than later in the compilation chain. The instrumentation can occur in between semantic analysis and code generation. The instrumentation can occur in an instrumenting rewriting phase. The instrumentation can occur in a first lowering phase in which high level constructs in a programming language are rewritten as lower level constructs in intermediate representation (IR). The compiler can inject the instrumentation code at particular points in the source code based on specified language constructs in the source program. The types of instrumentation injected can be extended by providing additional information to the compiler at compilation time, without the need to reprogram the compiler.

20 Claims, 9 Drawing Sheets

(56) References Cited

U.S. PATENT DOCUMENTS

| | | | |
|---|---|---|---|
| 6,434,741 | B1 | 8/2002 | Mirani et al. |
| 6,662,362 | B1* | 12/2003 | Arora ............... G06F 8/4441 |
| | | | 714/E11.209 |
| 7,047,521 | B2 | 5/2006 | Bunnell |
| 7,805,707 | B2 | 9/2010 | Pouliot |
| 7,805,717 | B1 | 9/2010 | Spertus et al. |
| 8,756,584 | B2 | 6/2014 | Zhou |
| 9,836,379 | B2 | 12/2017 | Badea et al. |
| 2002/0016918 | A1 | 2/2002 | Tucker et al. |
| 2004/0015953 | A1 | 1/2004 | Vincent |
| 2005/0039187 | A1 | 2/2005 | Avakian et al. |
| 2005/0251790 | A1 | 11/2005 | Hundt |
| 2006/0048114 | A1 | 3/2006 | Schmidt |
| 2007/0180439 | A1* | 8/2007 | Sundararajan ...... G06F 11/3644 |
| | | | 717/158 |
| 2007/0234299 | A1 | 10/2007 | Watanabe |
| 2009/0024986 | A1 | 1/2009 | Meijer et al. |
| 2009/0178031 | A1* | 7/2009 | Zhao ................. G06F 8/427 |
| | | | 717/143 |
| 2010/0037101 | A1* | 2/2010 | Zakonov ............ G06F 11/3409 |
| | | | 714/38.1 |
| 2010/0077388 | A1 | 3/2010 | Kimura |
| 2012/0079460 | A1 | 3/2012 | Cho et al. |
| 2012/0246627 | A1 | 9/2012 | Partridge et al. |
| 2012/0265824 | A1 | 10/2012 | Lawbaugh |
| 2015/0309813 | A1 | 10/2015 | Patel |
| 2016/0259636 | A1* | 9/2016 | Plate ................. G06F 8/68 |
| 2016/0357655 | A1 | 12/2016 | Mukai |
| 2017/0090874 | A1* | 3/2017 | Blumenau .......... G06F 9/45512 |
| 2018/0032320 | A1 | 2/2018 | Aldea Lopez |
| 2018/0260197 | A1 | 9/2018 | Tsingauz et al. |
| 2019/0260304 | A1 | 9/2018 | Matousek et al. |

OTHER PUBLICATIONS

U.S. Appl. No. 15/454,912, Matousek, et al., "Mapping Dynamic Analysis Data to Source Code", filed Mar. 9, 2017.

David, "Incompatibility with Cudafy.Net", http://forum.ncrunch.net/yaf_postsm5944_Incompatibility-with-Cudafy-Net.aspx, Retrieved on: Jan. 11, 2017, 2 pages.

"Instrumenting and Compiling the Source Code", https://www.ibm.com/support/knowledgecenter/en/SSSHUF_8.0.0/com.ibm.rational.testrt.studio.doc/topics/tclicompile.htm, Retrieved on: Jan. 11, 2017, 2 pages.

Baxter, Ira. D., "Branch Coverage for Arbitrary Languages Made Easy: Transformation Systems to the Rescue!", http://www.semdesigns.com/Company/Publications/TestCoverage.pdf, Published on: Jan. 23, 2002, 6 pages.

"Ada code instrumentation as GNAT compilation part?", https://web.archive.org/web/20141005202153/http:/stackoverflow.com/questions/22111437/ada-code-instrumentation-as-gnat-compilation-part, Published on: Oct. 5, 2014, 2 pages.

"Adding source instrumentation code—Is source-to-source compiler right approach? How to build one?", https://web.archive.org/web/20140922144558/http:/stackoverflow.com/questions/12969420/adding-source-instrumentation-code-is-source-to-source-compiler-right-approach, Published on: Sep. 22, 2014, 2 pages.

Luk, et al., "Pin: Building Customized Program Analysis Tools with Dynamic Instrumentation", In Proceedings of ACM Sigplan Notices, vol. 40, No. 6, Jun. 12, 2005, 11 pages.

"Dynamic code analysis", http://www.viva64.com/en/t/0070/, Published on: Jan. 31, 2013, 5 pages.

Brats, Hadi, "Application Instrumentation: Application Analysis with Pin", https://msdn.microsoft.com/en-us/magazine/dn818497.aspx, Published on: Nov. 2014, 16 pages.

Allen, et al., "Computational Science—ICCS 2009: 9th International Conference Baton Rouge", In Proceedings of 9th International Conference Baton Rouge, May 25, 2009, 2 pages.

Larus, et al., "Rewriting executable files to measure program behavior", In Journal of Software: Practice and Experience, vol. 24, Issue 2, Feb. 1994, pp. 197-218.

"Profiling (computer programming)", https://en.wikipedia.org/wiki/Profiling_(computer_programming), Retrieved on: Feb. 27, 2017, 6 pages.

Srivastava, et al., "ATOM: A System for Building Customized Program Analysis Tools", In WRL Research Report 94/2, Mar. 1994, 27 pages.

"Final Office Action Issued in U.S. Appl. No. 15/454,949", dated Oct. 18, 2019, 49 Pages.

"Non Final Office Action Issued in U.S. Appl. No. 15/454,949", dated May 21, 2019, 44 Pages.

"Non Final Office Action Issued in U.S. Appl. No. 15/454,912", dated Apr. 5, 2018., 27 Pages.

"Non Final Office Action Issued in U.S. Appl. No. 15/454,949", dated Aug. 7, 2018., 31 Pages.

"Final Office Action Issued in U.S. Appl. No. 15/454,949", dated Dec. 5, 2018, 40 Pages.

"Non Final Office Action Issued in U.S. Appl. No. 15/454,949", dated Mar. 31, 2020, 53 Pages.

"Notice of Allowance issued on U.S. Appl. No. 15/454,949", dated Jul. 30, 2020, 8 Pages.

* cited by examiner

```
statementList
└─statements
  ├─gotoStatement
  │ └─label: <continue-7>
  ├─labelStatement
  │ └─label: <start-8>
  ├─expressionStatement
  │ └─expression
  │   └─assignmentOperator
  │     ├─left
  │     │ └─parameter
  │     │   ├─parameterSymbol: System.Boolean p
  │     │   └─type: System.Boolean
  │     ├─right
  │     │ └─literal
  │     │   ├─constantValueOpt: ConstantValueDefault(False: Boolean)
  │     │   └─type: System.Boolean
  │     └─type: System.Boolean
  ├─labelStatement
  │ └─label: <continue-7>
  ├─conditionalGoto
  │ ├─condition
  │ │ └─parameter
  │ │   ├─parameterSymbol: System.Boolean p
  │ │   └─type: System.Boolean
  │ ├─jumpIfTrue: True
  │ └─label: <start-8>
  └─labelStatement
    └─label: <break-6>
```

```
return ++p;
returnStatement
 ├─refKind: None
 └─expressionOpt
    └─incrementOperator
       ├─operatorKind: IntPrefixIncrement
return: int
       ├─operand
       │  └─parameter
       │     ├─parameterSymbol: System.Int32 p
       │     └─type: System.Int32
       └─type: System.Int32
```

<u>154</u>

```
return (p += 1);

returnStatement
 ├─refKind: None
 └─expressionOpt
    └─compoundAssignmentOperator
       ├─@operator: kind: IntAddition left: int right: int
       ├─left
       │  └─parameter
       │     ├─parameterSymbol: System.Int32 p
       │     └─type: System.Int32
       ├─right
       │  └─literal
       │     ├─constantValueOpt: ConstantValueOne(1: Int32)
       │     └─type: System.Int32
       └─type: System.Int32
```

```
returnStatement
├─refKind: None
└─expressionOpt
  └─sequence
    ├─locals: {System.Int32?}
    ├─sideEffects
    │ ├─assignmentOperator
    │ │ ├─left
    │ │ │ └─local
    │ │ │   ├─localSymbol: System.Int32?
    │ │ │   └─type: System.Int32
    │ │ ├─right
    │ │ │ └─binaryOperator
    │ │ │   ├─operatorKind: IntAddition
    │ │ │   ├─left
    │ │ │   │ └─parameter
    │ │ │   │   ├─parameterSymbol: System.Int32 p
    │ │ │   │   └─type: System.Int32
    │ │ │   ├─right
    │ │ │   │ └─literal
    │ │ │   │   ├─constantValueOpt: ConstantValueOne(1: Int32)
    │ │ │   │   └─type: System.Int32
    │ │ │   └─type: System.Int32
    │ │ └─type: System.Int32
    │ └─assignmentOperator
    │   ├─left
    │   │ └─parameter
    │   │   ├─parameterSymbol: System.Int32 p
    │   │   └─type: System.Int32
    │   ├─right
    │   │ └─local
    │   │   ├─localSymbol: System.Int32 ?
    │   │   └─type: System.Int32
    │   └─type: System.Int32
    ├─value
    │ └─local
    │   ├─localSymbol: System.Int32 ?
    │   └─type: System.Int32
    └─type: System.Int32
```

INSTRUMENTING PROGRAM CODE

CROSS-REFERENCE TO RELATED APPLICATIONS

The application is related in subject matter to co-pending U.S. patent application Ser. No. 15/454,949 entitled "EXTENSIBLE INSTRUMENTATION", filed on Mar. 9, 2017. The application is related in subject matter to co-pending U.S. patent application Ser. No. 15/454,912 entitled "MAPPING DYNAMIC ANALYSIS DATA TO SOURCE CODE", filed on Mar. 9, 2017.

BACKGROUND

Instrumentation is a technique in which instructions are added to a program to collect information when the program runs. Typically, the information collected relates to performance or other behavioral characteristics of the program. A program can be instrumented manually (meaning that the instructions are added, usually to the source code, by a person). A program can be instrumented automatically, by another program (e.g., by a compiler, etc.). Instrumentation can be added to the source code, to byte code or to a compiled binary. Code can be instrumented as the source code is developed. Code can be instrumented right before execution (runtime instrumentation).

SUMMARY

A compiler can instrument a program during the front end of compilation to collect data about runtime behavior when the program is executed. Instrumentation can occur during source language processing rather than later in the compilation chain. The instrumentation can occur in between semantic analysis and code generation. The instrumentation can occur in a first lowering phase in which high level instrumentation-eligible constructs in a programming language are rewritten as lower level constructs in an intermediate representation (IR). The instrumentation can occur when an un-instrumented bound tree representing a program is received by an instrumenting rewriter. The instrumentation can be applied to the un-instrumented bound tree representing the program to create an instrumented bound tree. The compiler can inject the instrumentation code at particular points in the code based on specified language constructs in the source program. The instrumentation can collect information about runtime behavior when the program executes.

Instrumentation-eligible language constructs and their instrumentation can be extended without changing (reprogramming) the compiler because the language construct to be instrumented and the particular instrumentation desired for the language construct can be provided to the compiler for each individual compilation.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 1c is a block diagram illustrating other examples of source code 154, 156 and lowered source code 158 in accordance with aspects of the subject matter disclosed herein;

DETAILED DESCRIPTION

Overview

Figure 1A:
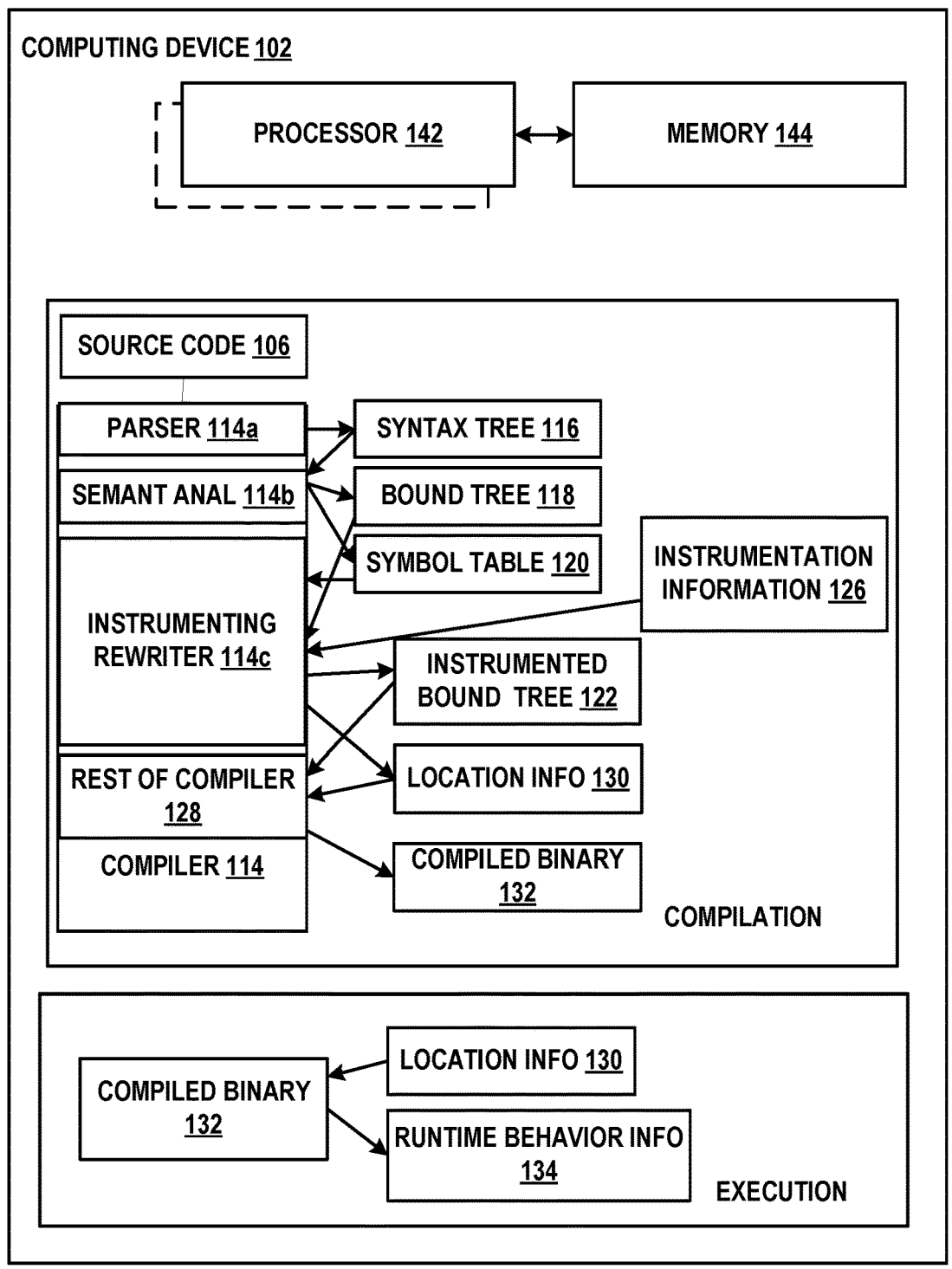
FIG. 1a is a block diagram illustrating an example of a system 100 for instrumenting program code in accordance with aspects of the subject matter disclosed herein.

One known approach to instrumentation rewrites program source code to add instrumentation before compilation. This approach is limited by definition to transformations that are practical at the source code level and so, for example, is constrained by the expressiveness of the programming language in which the source code is written.

Another known approach injects instrumentation into a program after compilation. With this approach it is difficult to maintain accurate correspondence between the information collected and program source code in the presence of language constructs that undergo significant transformation during compilation.

All known approaches to automated instrumentation provide only a fixed set of predefined instrumentations. That is, for example, in known compilers, the set of instrumentations that can be made by the compiler are hard-coded into the compiler. New instrumentations cannot be added without reprogramming the compiler. In contrast, in accordance with aspects of the subject matter disclosed herein, instrumentation is performed while the program is being compiled based on information provided to the compiler for each compilation. Thus, the programming language constructs that are eligible for instrumentation can be added to by providing the new programming language construct(s) to the compiler at compile time. The instrumentation that is performed for a programming language construct can be added to, changed or newly supplied by providing this information to the compiler at compile time. Programming language constructs can be identified that correspond to particular parts of program structure including but not limited to: a statement, invocation, basic block, expression, method, subroutine, global function, class constructor, operator or any sequence of instructions as identified by the instrumentation information provided to the compiler at compile time.

The subject matter disclosed herein addresses the instrumentation of computer programs to collect data that can be used to determine dynamic characteristics of a program. Dynamic characteristics are characteristics of runtime behavior. Examples include but are not limited to: which statements of a program execute, how many times does a particular statement execute, how many times does a particular method execute, what is the set of actual receiver types for each virtual method call in a program, what is the size of an array allocated for an array creation expression, what is the maximum call stack depth at each method call site, what is the set of actual types encountered at each cast, are there patterns in traces of execution paths (e.g., does the path taken in one if statement correlate with the path taken in another if statement) and so on. The language constructs that are eligible for instrumentation do not have to be predefined but can be provided to the compiler at compilation time. The information that is collected does not have to be predefined but can be provided to the compiler at compilation time.

In accordance with some aspects of the subject matter disclosed herein, the instrumentation performed can be controlled and/or defined using information provided to the compiler at compilation time. Constructs eligible for instrumentation can be statically determined for a predefined analysis. That is, the compiler can be programmed to determine instrumentation-eligible programming language constructs and to insert appropriate instrumentation code for some instrumentations. Language constructs eligible for instrumentation can be provided to the compiler during compilation so that the compiler does not need to be changed programmatically to perform the instrumentations. Additional programming language constructs can be added to the set of instrumentation-eligible programming language constructs without reprogramming the compiler. Instrumentations to be performed on the additional programming language constructs can be added without changing the compiler. The instrumentation for an instrumentation-eligible programming language construct can also be provided to the compiler during compilation. In either case, the compiler can recognize a construct as it is encountered during compilation.

When an instrumentation-eligible programming language construct is recognized by the compiler as the program is being processed, the compiler can insert instrumentation code provided at compilation time into the program. In accordance with some aspects of the subject matter described herein, the instrumentation code can be inserted at an instrumenting rewriting phase of compilation. In accordance with some aspects of the subject matter described herein, the instrumentation code can be inserted at a lowering phase of compilation. When the instrumentation code is inserted, the code being processed is still very similar to the original source code. During the lowering phase higher level programming language constructs can be rewritten as lower level programming language constructs.

Instrumenting Program Code

A compiler is a program or set of computer programs (i.e., a compiler chain) that translates source code written in a programming language into another form—typically into a binary file consumable by a real or virtual computer. Compilers often are described as having a front end, a middle end and a back end. The front end includes lexical analysis, syntax analysis and semantic analysis. The output of the front end is an intermediate representation (IR) of the source code for processing by the middle end. An IR is a data structure or code used internally by a compiler or virtual machine to represent a program. A good IR is conducive to optimization and translation. Compilers typically operate in multiple phases. For example, phases for the front end may include a lexical analysis phase which converts the source code text into tokens, which are atomic units of the programming language. Examples of tokens include identifiers, keywords, numeric literals and operators.

During the syntax analysis phase, the token sequence is parsed to create a parse tree or syntax tree adhering to the rules of a formal grammar defining the syntax of the language. The parse tree is often analyzed, augmented, and transformed by later phases in the compiler.

In the semantic analysis phase(s) the compiler creates new trees including semantic information or adds semantic information to the parse tree and builds the symbol table. Semantic analysis can include type checking, object binding (associating variable and function references with their definitions to the syntax tree), checking that all local variables are initialized before use and so on. Warnings and error messages are typically produced during semantic analysis. Semantic analysis typically follows the parsing phase and precedes the code generation phase.

The middle end typically performs optimizations on a form other than the source code or machine code. The middle end can perform optimizations such as removal of useless or unreachable code and can move code around to make execution more efficient. The middle end may generate a particular type of IR for input to the back end.

The back end receives the output from the middle end. The back end may perform additional analyses and optimizations designed for a particular computer architecture. The back end can generate target-dependent output.

FIG. 1a is a block diagram illustrating an example of a system 100 for instrumenting program code in accordance with aspects of the subject matter disclosed herein. System 100 may collect information for dynamic analysis. All or portions of system 100 may reside on one or more computers or computing devices such as the computers described below with respect to FIG. 3. System 100 may execute wholly or partially within an IDE such as IDE 104 or can execute wholly or partially outside an IDE. An IDE can be an IDE such as the one described with respect to FIG. 4 or can be any other IDE. All or portions of system 100 may be implemented as a plug-in or add-on.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100 can be an on-premises system.

System 100 can include one or more computing devices. Contemplated computing devices include but are not limited to desktop computers, tablet computers, laptop computers, notebook computers, personal digital assistants, smart phones, cellular telephones, mobile telephones, sensors, server computers, client computers and so on. A computing device such as computing device 102 can include one or more processors such as processor 142, etc., and a memory such as memory 144 that communicates with the one or more processors.

System 100 may include one or more program modules that when loaded into the memory and accessed by the one or more processors cause the processor to perform the action or actions attributed to the one or more program modules. The processor(s) may be configured to perform the action or actions attributed to the one or more program modules. System 100 may include any one of or any portion of or any combination of any number of the following: a compiler or portion of a compiler such as compiler 114. Compiler 114 may include a parsing module such as parser 114a. Compiler 114 may include a semantic analyzing module such as semantic analyzer 114b. Compiler 114 may include an instrumenting rewriter such as instrumenting rewriter 114c.

A rewriter such as instrumenting rewriter 114c can rewrite code to insert instrumentation. Rewriter 114c in accordance with some aspects of the subject matter disclosed herein can rewrite higher level language constructs in a programming language into lower level language constructs in IR.

Compiler 114 can receive source code such as source code 106. Source code can be received in any programming language. Parser 114a may create a parse tree or syntax tree such as syntax tree 116 from the source code 106. Semantic analyzer 114b may receive the syntax tree 116 and create a bound tree such as bound tree 118. Semantic analyzer 114b may create a symbol table such as symbol table 120.

Figure 1B:
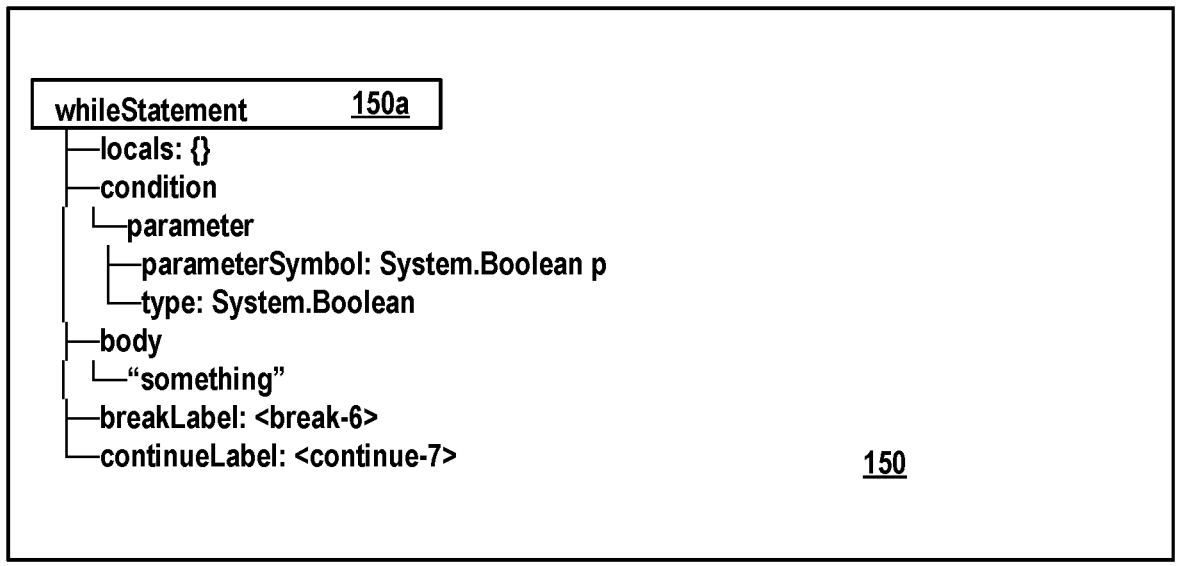
FIG. 1b is a block diagram illustrating an example of source code 150 and lowered source code 152 in accordance with aspects of the subject matter disclosed herein.

The bound tree 118 and the symbol table 120 from the semantic analyzer phase can be received by an instrumenting rewriter 114c. A traditional rewriter is a program or component that translates the form of an expression without changing its meaning. For example, a rewriter can be a lowering process in which higher level constructs of the programming language are rewritten into lower level constructs as described in more detail with respect to FIG. 1b. Consider for example a while construct such as the following statement in C# pseudo code:

```
While (p)
{
    <something>
}
``` where p is a parameter.
This statement means that while some parameter p is true something (not specified) will happen. An internal representation of the above statement before the lowering phase is reproduced in FIG. 1b in code block 150. A rewriter may receive the code as it appears in code block 150 and may output the lowered code as represented in FIG. 1b code block 152. It will be appreciated the code block 150 includes a while statement, statement 150a. The rewritten code represented in code block 152 includes no while statement. It will be apparent that after the statement has been lowered, it is difficult to determine that the lowered representation was a "while" statement in the source code.

Moreover, after the lowering process, some representations that are distinguishable in source code can become impossible to distinguish after the code is lowered. Consider the following two C# statements in which p is a parameter:
 return ++p;
and in which the statement uses an increment operator (++p) as an operand
and
 return (p+=1);
in which p is a parameter and in which the statement uses an assignment operator (p+=1) as an operand. FIG. 1c code block 154 represents the internal representation of the statement that uses the increment operator as an operand (return ++p); as received by the rewriter before lowering. Code block 156 represents the internal representation of the statement that uses the assignment operator as an operand (return (p+=1); as received by the rewriter before lowering. Code block 158 represents the internal representation for both these statements as output by the rewriter. It will be apparent that the distinction that existed before lowering has disappeared after lowering. There is no way to tell from the code in code block 158 what the operand was in the original source code.

In accordance with aspects of the subject matter described herein, an instrumenting rewriter such as instrumenting rewriter 114c can receive input such as, for example, the bound tree 118 and potentially, the symbol table 120. The instrumenting rewriter 114c can receive instrumentation information that specifies: a programming language construct to instrument and instrumentation code for the programming language construct, i.e., code that when executed collects the information desired. In accordance with some aspects of the subject matter disclosed herein, recognition of instrumentation-eligible language constructs and insertion of the code to perform the instrumentation can occur during an instrumenting rewriting phase before code generation, while the output is still quite similar to the original source code. In accordance with some aspects of the subject matter disclosed herein, recognition of an instrumentation-eligible language construct and insertion of the code to perform the instrumentation can occur during a lowering phase before code generation. An instrumentation-eligible language construct is one in which instrumentation code for the construct is known by or is provided to the compiler.

From the bound tree 118, the symbol table 120, and the instrumentation information such as instrumentation information 126 the instrumenting rewriter 114c can create an instrumented bound tree such as instrumented bound tree 122. From the bound tree 118, the symbol table 120, and the instrumentation information 126 in accordance with some aspects of the subject matter disclosed herein, the instrumenting rewriter 114c can create an instrumented lowered bound tree (not shown).

The instrumenting rewriter 114c can receive instrumentation information 126 that can specify one or more language constructs that are to be instrumented. For example, the information can specify that whenever a "for loop" programming language construct is encountered, specified information is to be collected. The instrumentation information 126 can specify the instrumentation to be inserted into the code.

Figure 1D:
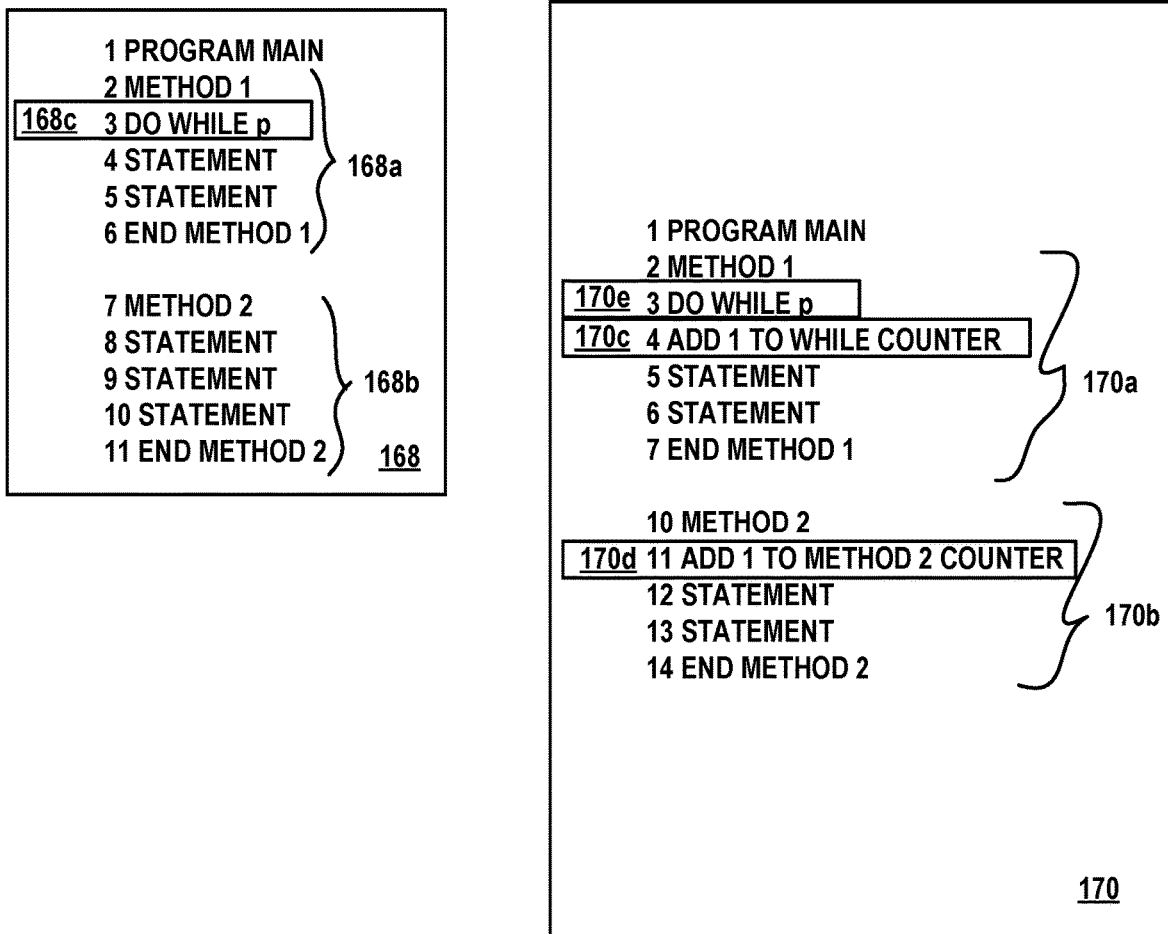
FIG. 1d is a block diagram illustrating an example of pseudo code for an un-instrumented program, 168 and pseudo code for the instrumented program 170 in accordance with aspects of the subject matter disclosed herein.

FIG. 1d code block 168 illustrates an example of pseudo code for an original un-instrumented program that includes two methods, Method 1 168a and Method 2 168b. FIG. 1d code block 170 illustrates the instrumented pseudo code.

Suppose a first instrumentation instruments code to count how many times the while loop of Method 1 (original un-instrumented pseudo code line 3 168c) executes and a second instrumentation instruments code to count how many times Method 2 168b executes. The instrumentation can be added to the code where indicated. For example, In FIG. 1d for the first instrumentation, instrumentation code 170c has been added to Method 1 170a after the While loop 170e corresponding to line 3 168c of the original pseudo code program. For the second instrumentation, instrumentation code 170d has been added to Method 1 170b after line 7 (Method 2 168b) of the original pseudo code program. In the instrumented pseudo code the first instrumentation appears on line 4 and the second instrumentation appears on line 11.

The instrumenting rewriter 114c may also generate information concerning the location of the instrumented programming language construct in the source code (e.g., location information 130 in FIG. 1a). The instrumented bound tree 122 and the location information 130 can be provided to the rest of the compiler chain 128. The rest of the compiler chain 128 can generate a compiled binary such as compiled binary 132. The location information 130 can be included in the compiled binary 132. The location information 130 can be in a separate file that is associated with the compiled binary 132. At execution time, the compiled binary 132 can collect the runtime behavior information 134 specified by the inserted instrumentation.

Figure 2:
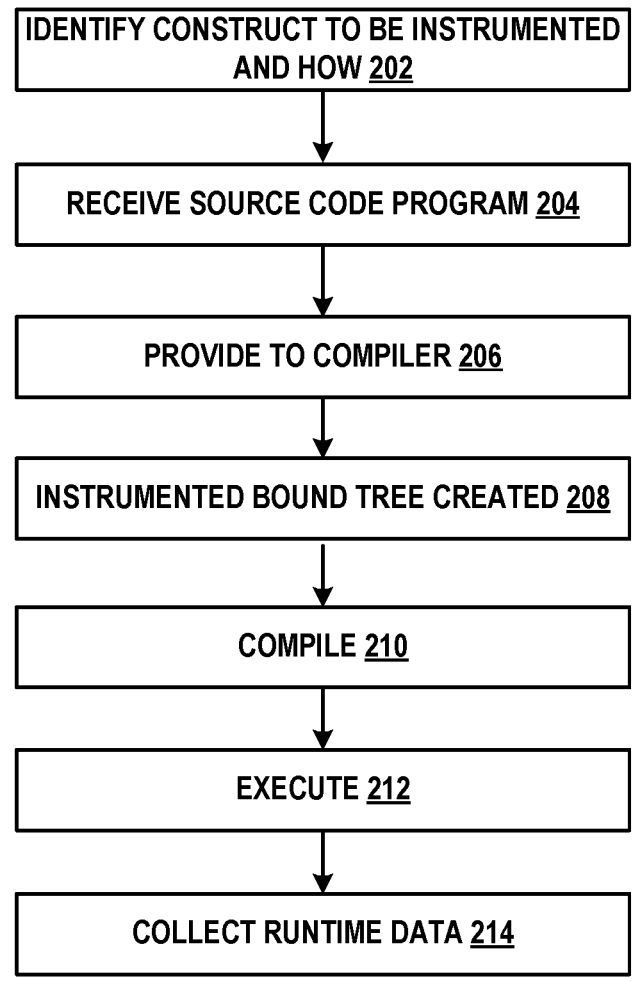
FIG. 2 is a flow diagram of an example of a method 200 for instrumenting program code in accordance with aspects of the subject matter disclosed herein.

FIG. 2 is a flow diagram of an example of a method 200 for instrumenting program code in accordance with aspects of the subject matter disclosed herein. The method described in FIG. 2 can be practiced by a system such as but not limited to the one described with respect to FIG. 1a. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated.

At operation 202, information can be received by a compiler that identifies a programming language construct to be instrumented. Information can be received about how the language construct is to be instrumented. As described above the information can be instrumentation information that is received by a compiler at compile time. The information can be instrumentation information that is received during compilation. At operation 204 a source code file for the program that is to be instrumented can be received. The source code file can be written in any suitable programming language including but not limited to Java, Pascal, C++ or any other suitable programming language. At operation 206 the source code file and the instrumentation information can be provided to a compilation process. At operation 208 an instrumenting rewriter of the front end of a compiler can generate an intermediate representation of an instrumented program as described above with respect to FIG. 1a. The intermediate representation of the instrumented program can be an instrumented bound tree. The intermediate representation of the instrumented program can be an instrumented lowered bound tree. Additional information including but not limited to location in the source code information for the instrumented programming language can be generated.

At operation 210 the intermediate representation can be further compiled into a compiled binary. At operation 212 the compiled binary can be executed. At operation 214 information about runtime behavior of the instrumented program can be collected. Information collected can include but is not limited to: which statements of a program execute, how many times does a particular statement execute, how many times does a particular method execute, what is the set of actual receiver types for each virtual method call in a program, what is the size of an array allocated for an array creation expression, what is the maximum call stack depth at each method call site, what is the set of actual types encountered at each cast, are there patterns in traces of execution paths (e.g., does the path taken in one if statement correlate with the path taken in another if statement) and so on.

Described herein is a compiler that can receive information identifying a programming language construct in a program, receive instrumentation to be performed on the programming language construct in the program; and insert the instrumentation into an instrumented bound tree representing the program, the instrumented bound tree created by an instrumenting rewriter of the compiler. The compiler can include an instrumenting rewriter that can convert the programming language construct from a higher level construct in source code for the program to a lower level construct in intermediate representation. The compiler can include an instrumenting rewriter that can insert the instrumentation into the instrumented bound tree during a source language processing phase of compilation. The instrumentation can be inserted between a semantic analysis phase and a code generation phase of compilation. An additional programming language construct and an instrumentation for the programming language construct can be added to a set of instrumentation-eligible programming language constructs without reprogramming the compiler. The instrumentation can collect information about characteristics of runtime behavior of the program. The information identifying a programming language construct in a program to be instrumented can be received at compile time. The instrumentation to be performed on the programming language construct in the program can be received at compile time.

Described herein is a compiler in which instrumentation performed is extensible without reprogramming the compiler. Described herein is an instrumenting rewriter in which additional instrumentation-eligible programming language constructs can be identified without reprogramming the compiler. Described herein is a method in which a compiler can receive for a particular compilation, instructions for instrumenting an identified programming language construct of a source code program, insert instrumentation for the identified programming language construct into code representing the program and can generate an instrumented bound tree comprising the instrumented programming language construct. A set of instrumentation-eligible programming language constructs can be extensible without reprogramming the compiler. The instrumentation performed can be extensible without reprogramming the compiler. Information locating the programming language construct in the source code program can be captured. The programming language construct can be rewritten in a lower form in the instrumented bound tree. Described herein is a device for instrumenting code during the front end of compilation, the device comprising a memory and a processor, the processor configured to rewrite a higher level programming language construct of a source code program into a lower level construct in a representation of the source code program comprising intermediate representation (IR), receive instructions for identifying the higher level programming language construct, receive instructions for instrumenting the higher level programming language construct, store a location of the higher level programming language construct in the source code program and instrument the lower level construct in the IR. A set of instrumentation-eligible programming language constructs can be extensible without reprogramming the compiler. Instrumentations performed on a programming language construct are extensible without reprogramming the compiler. The processor can be configured to create an instrumented bound tree during source language processing in a front end of a compilation process. The instrumented bound tree can be a representation of the source code program in intermediate representation.

Described herein is a device for instrumenting code during the front end of compilation, the device comprising a memory and a processor, the processor configured to rewrite a higher level programming language construct of a source code program into a lower level construct in a representation of the source code program comprising intermediate representation (IR), receive instructions for identifying the higher level programming language construct, receive instructions for instrumenting the higher level programming language construct, store a location of the higher level programming language construct in the source code program and instrument the lower level construct in the IR. A set of instrumentation-eligible programming language constructs can be extensible without reprogramming the compiler. Instrumentations performed on a programming language construct are extensible without reprogramming the compiler. The processor can be configured to create an instrumented bound tree during source language processing in a front end of a compilation process. The instrumented bound tree can be a representation of the source code program in intermediate representation.

Exemplary Operating Environment

Figure 3:
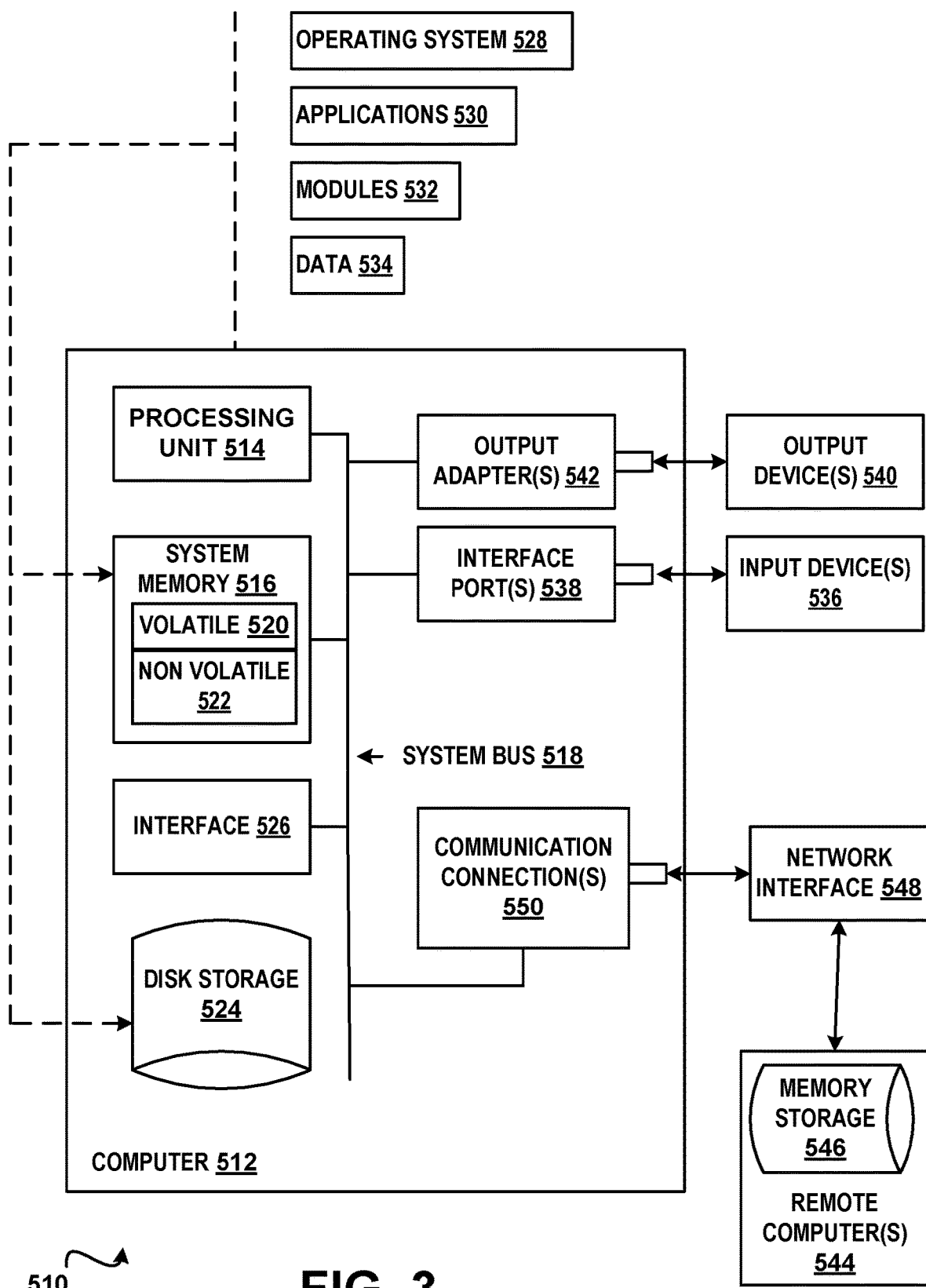
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above.

Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
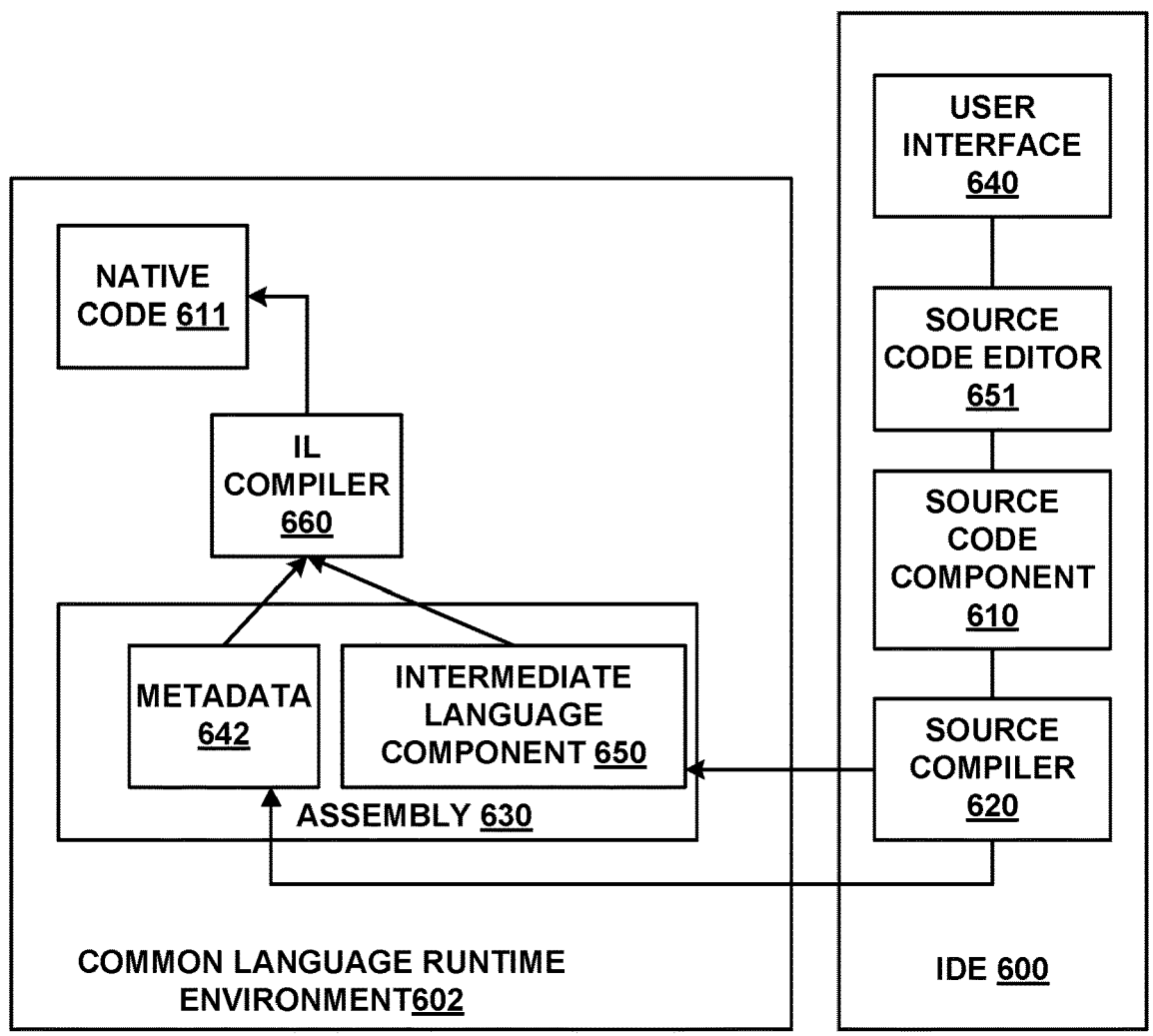
FIG. 4 is a block diagram of an example of an integrated development environment in accordance with aspects of the subject matter described herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform. A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A compiler executing on a processor of a computing device, the processor configured to:
   receive information identifying a programming language construct in a program;
   receive instrumentation to be performed on the programming language construct in the program, such that, for a particular compilation of the program, instrumentation capabilities of the compiler are extended beyond a fixed set of predefined instrumentations hard-coded into the compiler without reprogramming the compiler;
   obtain a bound tree representing the program, the bound tree being produced by the compiler after semantic analysis of the program; and
   prior to code generation by the compiler, insert the instrumentation to be performed on the programming language construct into the bound tree to obtain an instrumented bound tree using an instrumenting rewriter of the compiler.

2. The compiler of claim 1, wherein the instrumenting rewriter converts the programming language construct from a higher level construct in source code for the program to a lower level construct in intermediate representation.

3. The compiler of claim 1, wherein the programming language construct comprises at least one of a statement, an invocation, a basic block, an expression, a method, a subroutine, a global function, a class constructor, or an operator.

4. The compiler of claim 1, wherein the processor is configured to:
   parse source code of the program to obtain a parse tree or syntax tree; and
   process the parse tree or the syntax tree with a semantic analyzer of the compiler to generate the bound tree.

5. The compiler of claim 1, wherein the processor is configured to:
   add other instrumentation for another programming language construct to a set of instrumentation-eligible programming language constructs without reprogramming the compiler.

6. The compiler of claim 1, wherein the instrumentation collects information about characteristics of runtime behavior of the program.

7. The compiler of claim 1, wherein the information identifying the programming language construct to be instrumented is received at compile time.

8. The compiler of claim 1, wherein the instrumentation to be performed on the programming language construct in the program is received at compile time.

9. The instrumenting rewriter of claim 1, wherein the processor is configured to:
identify and instrument additional instrumentation-eligible programming language constructs in the program without reprogramming the compiler.

10. A method comprising:
receiving, by a compiler for a particular compilation of source code of a program, instructions for instrumenting an identified programming language construct of the program;
by the compiler, generating a tree representing the program after semantic analysis of the program by the compiler;
prior to code generation by the compiler, inserting instrumentation for the identified programming language construct into the tree to obtain an instrumented tree representing the program without reprogramming the compiler, such that instrumentation capabilities for the particular compilation of the program are extended beyond a fixed set of predefined instrumentations hard-coded into the compiler; and
using the compiler, generating a compiled binary based at least on the instrumented tree having the instrumentation for the identified programming language construct inserted therein.

11. The method of claim 10, further comprising:
extending a set of instrumentation-eligible programming language constructs without reprogramming the compiler.

12. The method of claim 10, wherein the tree comprises a bound tree and the instrumented tree comprises an instrumented bound tree.

13. The method of claim 10, further comprising:
by the compiler, capturing information locating the identified programming language construct in the source code of the program.

14. The method of claim 10, further comprising:
by the compiler, rewriting the identified programming language construct in a lower form in the instrumented tree.

15. A device comprising:
a memory; and
a processor, the processor configured to:
for a particular compilation of a source code program and after semantic analysis of the source code program by a compiler, rewrite a higher level programming language construct of the source code program into a lower level construct in an intermediate tree representation;
receive instructions identifying the higher level programming language construct;
receive instructions for instrumenting the higher level programming language construct, wherein the higher level programming language construct lacks a corresponding predefined instrumentation hard-coded into the compiler;
store a location of the higher level programming language construct in the source code program; and
prior to code generation by the compiler, instrument the lower level construct in the intermediate tree representation to obtain an instrumented tree representation of the source code program.

16. The device of claim 15, wherein the processor is configured to:
extend a set of instrumentation-eligible programming language constructs with at least two new programming language constructs without reprogramming the compiler.

17. The device of claim 15, wherein the instrumented tree representation is produced without reprogramming the compiler when the particular compilation occurs.

18. The device of claim 15, wherein the processor is further configured to:
create the instrumented tree representation during source language processing in a front end of a compilation process by the compiler.

19. The device of claim 18, wherein the instrumented tree representation is an instrumented bound tree.

20. The device of claim 15, wherein the higher level programming language construct comprises at least one of a statement, an invocation, a basic block, an expression, a method, a subroutine, a global function, a class constructor, or an operator.

* * * * *